United States Patent [19]

Fukushima et al.

[11] Patent Number: 5,040,115
[45] Date of Patent: Aug. 13, 1991

[54] SYSTEM FOR MONITORING VEHICLE SLIP ANGLE

[75] Inventors: Naoto Fukushima; Yukio Fukunaga; Yohsuke Akatsu; Itaru Fujimura; Masaharu Satoh, all of Kanagawa, Japan

[73] Assignee: Nissan Motor Company, Limited, Yokohama, Japan

[21] Appl. No.: 339,834

[22] Filed: Apr. 18, 1989

[30] Foreign Application Priority Data

Apr. 19, 1988 [JP] Japan .................................. 63-95859

[51] Int. Cl.$^5$ .......................... G06F 7/70; G06F 15/48; G06F 15/50; B60G 11/26
[52] U.S. Cl. ............................ 364/424.01; 364/426.01; 364/434; 280/707
[58] Field of Search ....................... 364/424.01, 426.01, 364/426.02, 426.03, 434, 424.05, 426.04; 280/707; 180/79.1

[56] References Cited

U.S. PATENT DOCUMENTS

| 4,779,202 | 10/1988 | Leiber | 364/426.03 |
| 4,794,539 | 12/1988 | Wallentowitz et al. | 364/426.01 |
| 4,809,183 | 2/1989 | Eckert | 364/426.02 X |
| 4,844,557 | 7/1989 | Giers | 364/426.02 X |
| 4,849,891 | 7/1989 | Krohn et al. | 364/426.01 X |

Primary Examiner—Parshotam S. Lall
Assistant Examiner—E. J. Pipala
Attorney, Agent, or Firm—Foley & Lardner

[57] ABSTRACT

A slip angle monitoring system directly compares an absolute value of lateral acceleration with an experimentarily derived given value which serves as a slip criterion to determine slip angle of a vehicle. Slip angle is set at zero while the absolute value of the lateral acceleration is smaller than or equal to the given value. On the other hand, when the absolute value is greater than the given value, the slip angle is derived by dividing the lateral acceleration by the longitudinal acceleration or by taking the minus one power of the tangent of the quotient obtained by dividing the lateral acceleration by the longitudinal acceleration, that is, the cotangent of the quotient.

13 Claims, 4 Drawing Sheets

SYSTEM FOR MONITORING VEHICLE SLIP ANGLE

BACKGROUND OF THE INVENTION

1. Field of the Invention

The present invention relates to a system for monitoring slip the angle of a vehicle, such as an automotive vehicle. More specifically, the invention relates to a system which can project vehicular slip angle having simple construction and a simplified process.

2. Description of the Background Art

In modern control systems for controlling vehicular activity of an automotive vehicle, such as a suspension control system, an anti-akid brake control system, a power train control and so forth, the slip angle at a road wheel is one of the parameters for performing precise control operation. In order to monitor the wheel slip angle, Japanese Patent First (unexamined) Publication No. 62-299430 discloses a vehicular attitude control system for a four-wheel drive type vehicle, which controls wheel slip angle within a desired range. The disclosed system includes a longitudinal acceleration sensor for monitoring longitudinal acceleration exerted on the vehicular body and a lateral acceleration sensor for monitoring lateral acceleration exerted on the vehicle body. Wheel slippage data is derived by dividing the lateral acceleration value by the longitudinal acceleration value. The arithmetic operation is performed when a judgement is made that the vehicle is traveling on a curved road or corner. Such a judgement, in the proposed system, is made by monitoring steering angular displacement to detect a steering angle greater than a predetermined value. The disclosure further proposes to detect the vehicular condition of passing through the curved road or corner by comparing the longitudinal acceleration and the lateral acceleration.

The disclosed system intends to control the drifting magnitude of the four-wheel drive type vehicle for tight cornering and preventing spinning of the vehicle due to excess slip angle on the wheel. In this aspect, the disclosed system is successful for providing slip angle data for a control system which controls means for generating a yawing force for drifting.

However, when the disclosed system is applied for proving slip angle data for a purpose other than drift control, the accuracy level of detection of the occurrence of the lateral slip of the wheel simply monitored on the basis of the steering angle, cannot be satisfactorily high for a control operation requiring higher a precision level of detection of the slip angle. Namely, since the magnitude of lateral acceleration is variable depending upon the vehicle speed even at the same steering angular displacement, slip angle can be varied depending upon not only the steering angular position but also vehicular speed. When the vehicle speed is high, a relatively large wheel slip angle can be created even by a small magnitude steering angular displacement.

On the other hand, in the latter case, when the vehicle is driven at a substantially constant speed, the longitudinal acceleration on the vehicle body is maintained substantially zero. Therefore, any magnitude of lateral acceleration may cause the judgement that the vehicle is turning. Furthermore, when the vehicle is in deceleration (acceleration being negative), lateral acceleration held at zero becomes greater than the longitudinal acceleration to trigger slip angle derivation. On the other hand, while the vehicle is in a decelerating or acceleration state, the longitudinal acceleration can be greater than the lateral acceleration so that the system should ignore it so as to not perform derivation of the wheel slip angle despite the fact that the vehicle is turning.

SUMMARY OF THE INVENTION

Therefore, it is an object of the present invention to provide a system for monitoring slip angle on a vehicle.

In order to accomplish aforementioned and other objects, a slip angle monitoring system, according to the present invention, directly compares an absolute value of lateral acceleration with an experimentally derived given value which serves as a slip criterion to derive slip angle on a vehicle. Slip angle is set at zero while the absolute value of the lateral acceleration is smaller than or equal to the given value. On the other hand, when the absolute value is greater than the given value, the slip angle is derived by dividing the lateral acceleration by the longitudinal acceleration or by taking the minus one power of the tangent of the quotient obtained by dividing the lateral acceleration by the longitudinal acceleration (i.e., the cotangent of the quotient).

Preferably, the slip angle may be corrected on the basis of wheel acceleration in order to incorporate a wheel acceleration dependent component in the resultant value.

In the a practical construction, the given value may be variable depending upon a vehicle speed or the longitudinal acceleration. According to one aspect of the invention, a system for monitoring the slip angle of a vehicle comprises:

a longitudinal acceleration monitoring unit for monitoring longitudinal acceleration exerted on the vehicle and producing a longitudinal acceleration indicative signal;

a lateral acceleration monitoring unit for monitoring lateral acceleration exerted on the vehicle and producing a lateral acceleration indicative signal;

a wheel speed sensor for monitoring rotation speed of a vehicular wheel to produce a wheel speed indicative signal; and an arithmetic circuit for receiving the longitudinal acceleration indicative signal, the lateral acceleration indicative signal and the wheel speed indicative signal, the arithmetic circuit deriving a basic slip angle on the basis of values of the longitudinal acceleration indicative signal and the lateral acceleration indicative signal, and correcting the basic slip angle with a correction factor derived on the basis of the wheel speed indicative signal.

According to another aspect of the invention, a system for monitoring the slip angle of a vehicle comprises:

a longitudinal acceleration monitoring unit for monitoring a longitudinal acceleration exerted on the vehicle and producing a longitudinal acceleration indicative signal;

a lateral acceleration monitoring means for monitoring a lateral acceleration exerted on the vehicle and producing a lateral acceleration indicative signal; and an arithmetic circuit for receiving the longitudinal acceleration indicative signal, the arithmetic circuit comparing the lateral acceleration indicative signal value with a predetermined lateral acceleration criterion to derive the slip angle data, setting the slip angle at zero when the lateral acceleration indicative signal value, is smaller than or equal to the criterion and calculates the slip angle on the basis of values of the longitudinal acceleration indicative signal and the lateral acceleration indicative signal value when the lateral acceleration indicative signal is greater than the criterion value.

According to a further aspect of the invention, a system for monitoring slip angle of a vehicle comprises:
a longitudinal acceleration monitoring unit for monitoring longitudinal acceleration exerted on the vehicle and producing a longitudinal acceleration indicative signal;
a lateral acceleration monitoring unit for monitoring lateral acceleration exerted on the vehicle and producing a lateral acceleration indicative signal;
a wheel acceleration monitoring unit for monitoring wheel acceleration and producing a wheel acceleration indicative data;
an arithmetic circuit for receiving the longitudinal acceleration indicative signal, the arithmetic circuit comparing the lateral acceleration indicative signal value with a predetermined lateral acceleration criterion to derive the slip angle data, setting the slip angle at zero when the lateral acceleration indicative signal value is smaller than or equal to the criterion and calculating a basic slip angle on the basis of values of the longitudinal acceleration indicative signal and the lateral acceleration indicative signal value when the lateral acceleration indicative signal is greater than the criterion value, and correcting the basic slip angle with a correction value derived on the basis of the wheel acceleration indicative data.

The arithmetic circuit may derive the correction factor by differentiating the wheel speed indicative signal. Practically, the correction factor is a wheel acceleration data to be added to the longitudinal acceleration indicative data.

The arithmetic circuit derives the basic slip angle by dividing the longitudinal acceleration indicative signal by the lateral acceleration indicative data.

BRIEF DESCRIPTION OF THE DRAWINGS

The present invention will be understood more fully from the detailed description of the invention given herebelow and from the accompanying drawings of the preferred embodiments of the invention, which, however, should not be taken to limit the invention to the specific embodiment, but are for explanation and understanding only.

In the drawings.

DESCRIPTION OF THE PREFERRED EMBODIMENT

Figure 1:
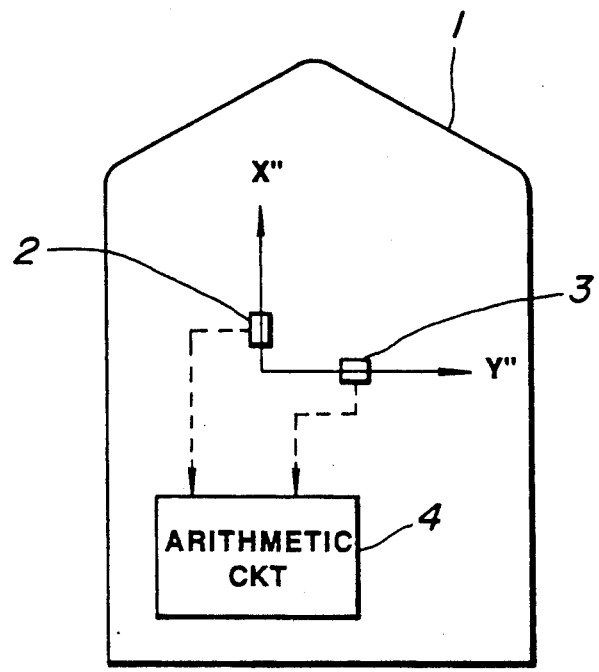
FIG. 1 is an illustration showing the first embodiment of a slip angle monitoring system according to the present invention, which is applied to an automotive vehicle.
Figure 2:
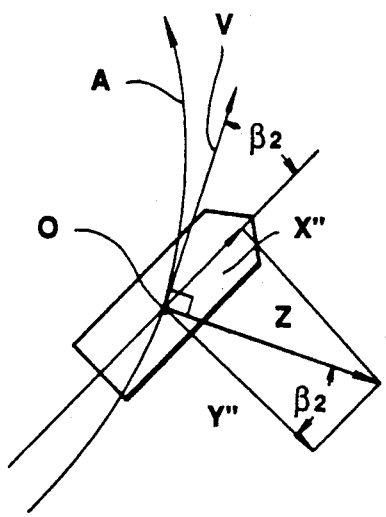
FIG. 2 is an illustration showing slip angle in relation to the vehicle activity including vehicle traveling direction and accelerations exerted on a vehicle body.

Referring now to the drawings, particularly to FIG. 1, the first embodiment of a slip angle monitoring system, according to the invention, has a longitudinal acceleration sensor 2 and a lateral acceleration sensor 3. These longitudinal and lateral acceleration sensors 2 and 3 may be arranged on appropriate positions on the vehicle body 1. The longitudinal acceleration sensor 2 monitors a longitudinal acceleration exerted on a vehicle body and produces a longitudinal acceleration indicative signal $X''$. The direction of the longitudinal acceleration coincides with the direction of the longitudinal axis of the vehicle body. The lateral acceleration sensor 3 monitors a lateral acceleration exerted on the vehicle body and produces a lateral acceleration indicative signal $Y''$. The direction of the lateral acceleration $Y''$ is transverse to the longitudinal axis of the vehicle body.

The longitudinal and lateral acceleration sensors 2 and 3 are connected to an arithmetic circuit 4 which arithmetically derives slip angle data. Assuming that the vehicle travels along a path represented by an arrow A, the center O of the vehicle body 1 passes a center of the path as indicated by the arrow A. During curving, a longitudinal acceleration as indicated by a vector $X''$ and a lateral acceleration as indicated by a vector $Y''$ are exerted on the vehicle body 1. A composite acceleration as indicator by a vector Z is the acceleration actually exerted on the vehicle body. On the other hand, vehicular speed vector V is in a tangential direction of to the curved path A. As seen, the composite acceleration vector Z points in a direction transverse to the vehicular speed vector V.

When the lateral acceleration $Y''$ is zero, the composite acceleration Z also becomes zero. This means that the vehicular speed vector V matches the vehicular longitudinal axis and thus the vehicle is traveling on a straight path. When the lateral acceleration $Y''$ is substantially small but not zero, the composite acceleration vector Z is offset from the vehicular speed vector V in a substantially small magnitude in an angular direction. As long as the angular shift of the composite acceleration vector Z with respect to the vehicular speed vector V is maintained substantially small, such an angular shift may not affect the cornering force of the vehicle. The angular shift range $\theta_0$ may be variable depending upon the vehicular cornering characteristics. Therefore, the angular shift range $\theta_0$ is experimentarily derived according to the cornering characteristics of the vehicle to which the preferred embodiment of the slip angle monitoring system is applied, and a desired precision level in monitoring the slip angle.

In a practical process in deriving the slip angle $\theta_1$, the absolute value $|Y''|$ of the lateral acceleration indicative signal value is compared with the reference value $\theta_0$. If the lateral value $|Y''|$ is smaller than or equal to the reference value $\theta_0$, then, the judgement is made that the vehicle is traveling on a substantially straight road. On the other hand, if the absolute value $|Y''|$ of the lateral acceleration is greater than the reference value $\theta_0$, the judgement is made that the vehicle is traveling on a curved road or turning a corner. Then, the slip angle $\theta_1$ is arithmetically calculated on the basis of the longitudinal acceleration indicative signal value $X''$ and the lateral acceleration indicative signal value $Y''$.

Namely, the slip angle $\theta_1$ can be calculated from one of the following equations:

$$\theta_1 = X''/Y'' \quad (1)$$

$$\theta_1 = \tan^{-1}(X''/Y'') \quad (2)$$

Figure 3:
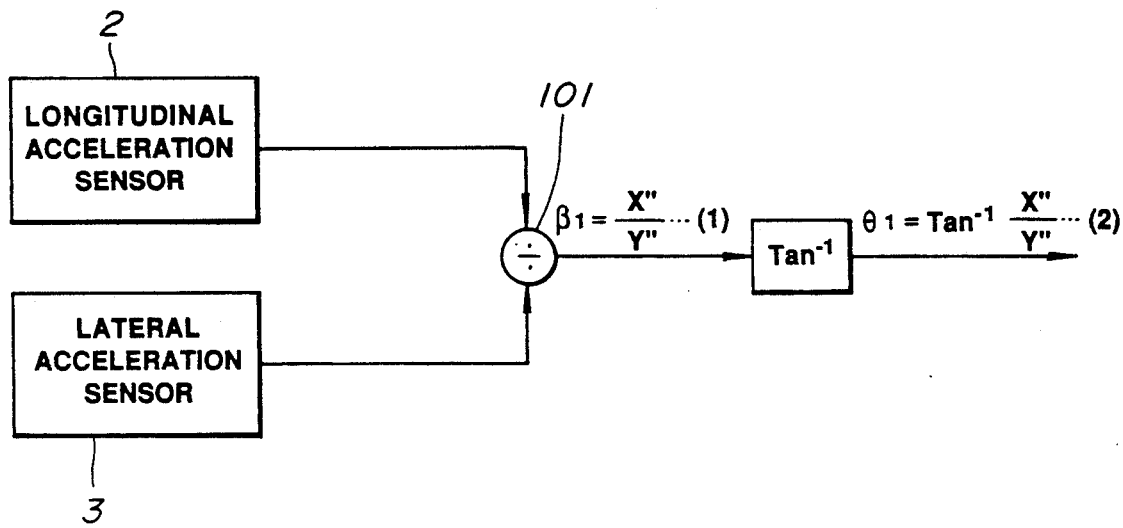
FIG. 3 is a block diagram of the preferred embodiment of a slip angle monitoring system of FIG. 1.

FIG. 3 shows a block diagram of the first embodiment of the slip angle monitoring system, according to the present invention. As seen from FIG. 3, the arithmetic circuit 4 has a divider 101 receiving the longitudinal and lateral acceleration indicative signals X'' and Y'' from the longitudinal and acceleration sensors. The divider 101 implements a dividing operation to divide the longitudinal acceleration indicative data X'' by the lateral acceleration indicative data Y''. The slip angle thus derived is fed to a circuit 102 for implementing calculation according to equation (2).

Figure 4:
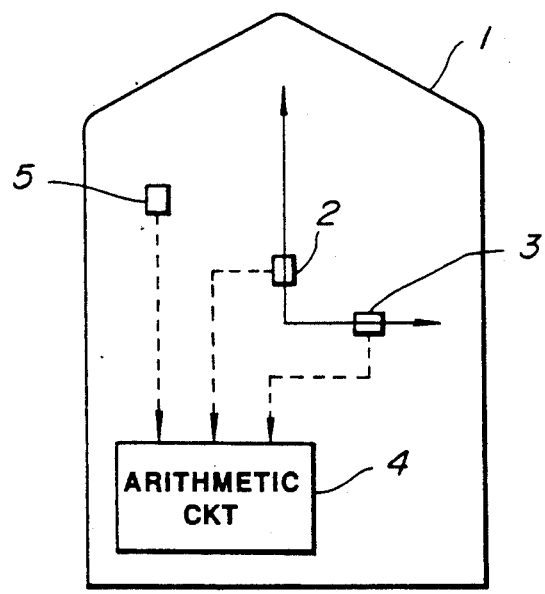
FIG. 4 is an illustration showing the second embodiment of a slip angle monitoring system according to the present invention, which is applied to an automotive vehicle.

FIG. 4 shows the second embodiment of the slip angle monitoring system according to the present invention. In this embodiment, a wheel speed sensor 5 is provided in addition to the system of FIG. 1. The wheel speed sensor 5 monitors rotation speed of a vehicular wheel to produce a wheel speed indicative signal. The wheel speed indicative signal of the wheel speed sensor 5 is fed to the arithmetic circuit 4.

The arithmetic circuit 4 performs an arithmetic operation to derive wheel acceleration indicative data Vx'' on the basis of the wheel speed indicative signal. The wheel acceleration indicative data Vx'' is practically derived by differentiation of the wheel speed indicative signal. With the wheel acceleration indicative data Vx'', a wheel acceleration dependent correction value is derived for correcting the slip angle derived on the basis of the longitudinal acceleration indicative signal value X'' and the lateral acceleration indicative signal value Y'' according to the equations of (1) and (2).

In practice, a corrected slip angle $\theta_2$ is derived by the following equations:

$$\theta_1 = (X'' + Vx'')/Y'' \quad (3)$$

and $$\theta_1 = \tan^{-1}\{(X'' + Vx'')/Y''\} \quad (4)$$

Figure 5:
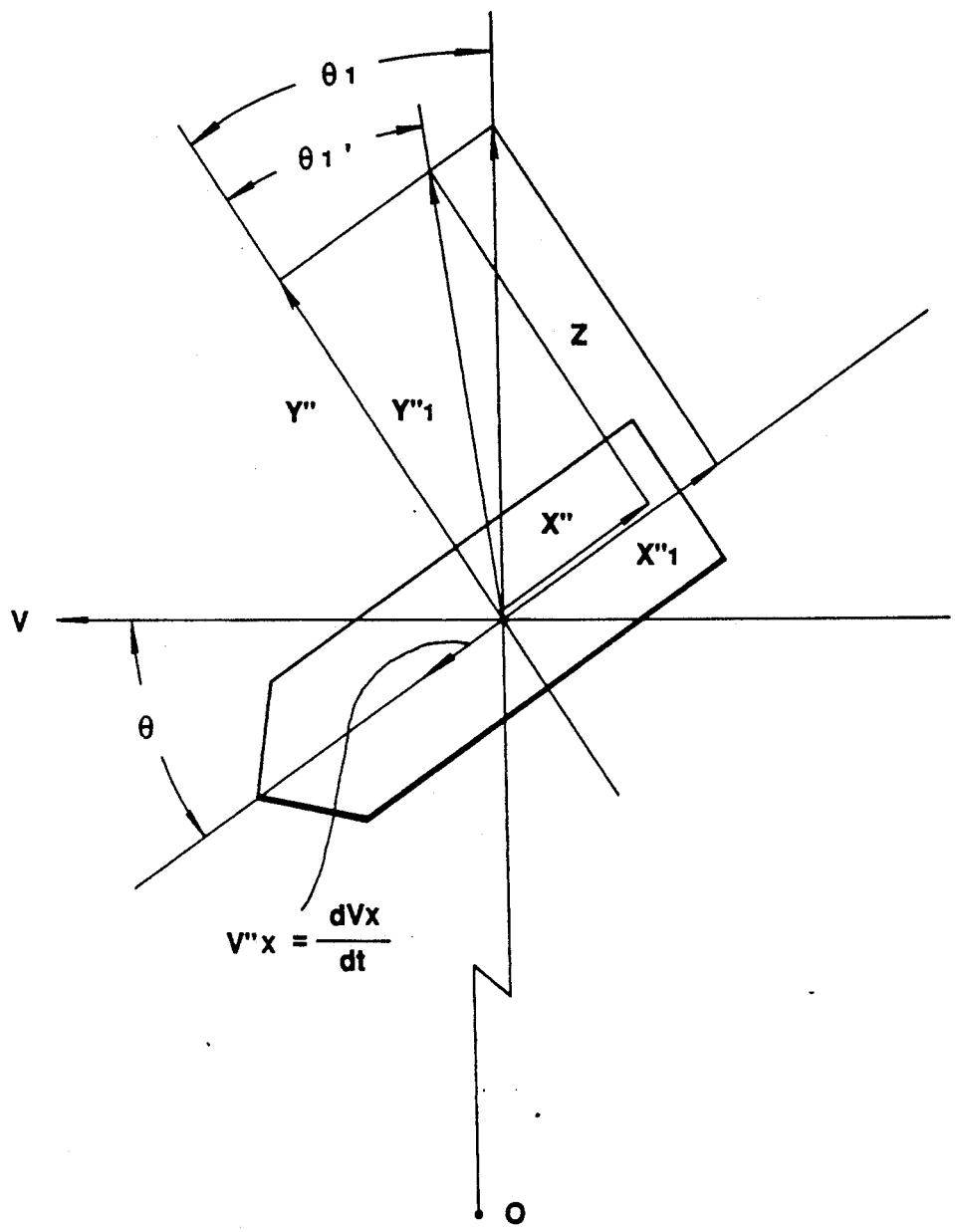
FIG. 5 is an illustration showing slip angle in relation to the vehicle activity including vehicle traveling direction and accelerations exerted on a vehicle body.

FIG. 5 shows the influence of wheel acceleration Vx'' on the slip angle derived on the basis of the longitudinal acceleration and the lateral acceleration. Namely, in the example of FIG. 5, the vehicle travels along a curved path which curves toward right with respect to the vehicular longitudinal axis. At the position shown, the vehicle speed vector V is offset in angle from the longitudinal axis of the vehicle body at an angle $\theta$. This can be precisely derived by incorporating wheel acceleration component Vx'' an additional component for determining the actual longitudinal acceleration $X_1'' = (X'' + Vx'')$ which is created by the centrifugal force during cornering. Assuming the lateral acceleration is Y'' or $Y_1''$, the composite acceleration is Z with an angle $\theta_1$. This can be compared with the composite acceleration derived on the basis of the longitudinal acceleration indicative signal value X'' and the lateral acceleration indicative signal data Y'' and can be appreciated that the slip angle thus derived taking the wheel acceleration dependent component, can provide higher accuracy than that of the former embodiment.

Figure 6:
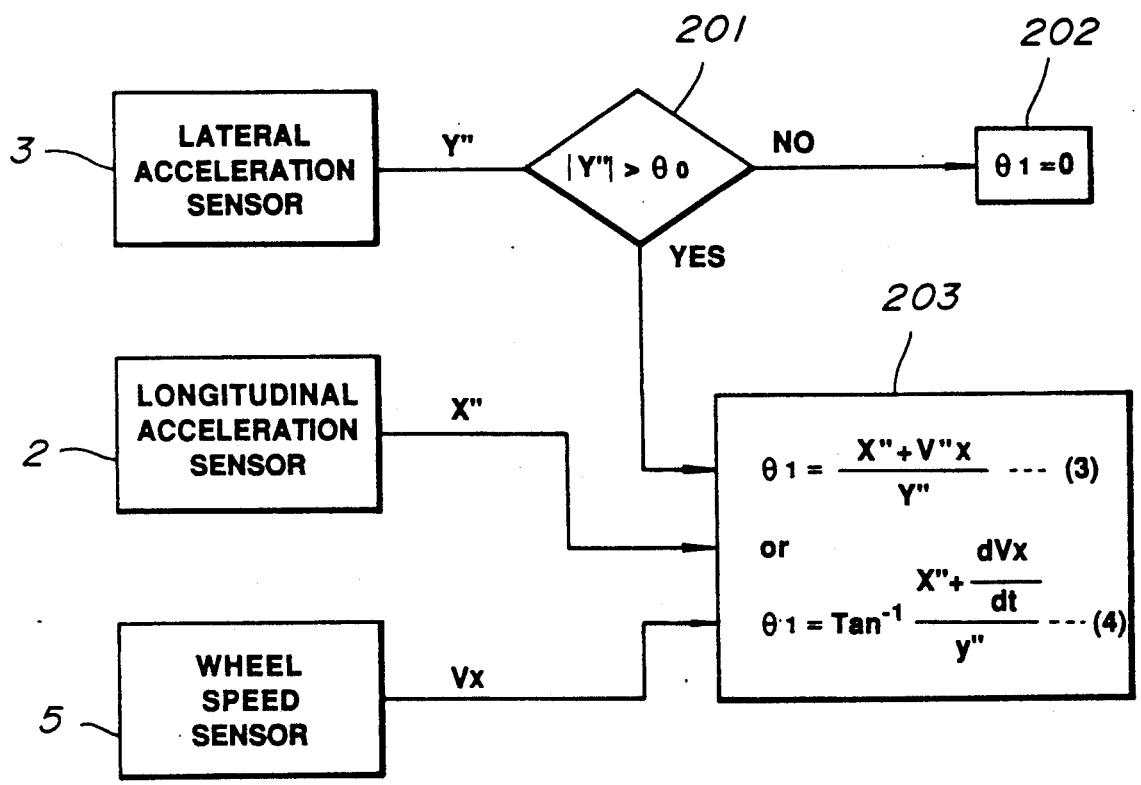
FIG. 6 is a block diagram of the second embodiment of a slip angle monitoring system of FIG. 1.

FIG. 6 shows a block diagram implementing the second embodiment of the slip angle monitoring system according to the present invention. As can be seen from FIG. 6, the arithmetic circuit 4 of the embodiment shown of the slip angle monitoring system includes a discrimination circuit 201 which receives the lateral acceleration indicative signal Y''. The discrimination circuit 201 derives an absolute value $|Y''|$ of the lateral acceleration indicative signal value and compares the absolute value with the given value $\theta_0$. The discrimination circuit 201 produces a discriminator signal indicating that the absolute value of the lateral acceleration indicative signal is smaller than or equal to the given value $\theta_0$ to a circuit 202 which outputs a zero level slip angle indicative signal. The discriminator circuit 201 on the other hand outputs the discriminator signal representative of the absolute value of the lateral acceleration indicative signal being greater than given value $\theta_0$ to a circuit 203. The circuit 203 performs an arithmetic operation according to the equation (3) or (4) as set forth above.

While the present invention has been disclosed in terms of the preferred embodiments in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A system for monitoring slip angle of a vehicle comprising:

longitudinal acceleration monitoring means for monitoring longitudinal acceleration exerted on said vehicle and producing a longitudinal acceleration inicative signal;

lateral acceleration monitoring means for monitoring lateral acceleration exerted on said vehicle and producing a lateral acceleration indicative signal;

a wheel speed sensor for monitoring rotation speed of a vehicular wheel to produce a wheel speed indicative signal; and an arithmetic circuit for receiving said longitudinal acceleration indicative signal, said lateral acceleration indicative signal and said wheel speed indicative signal, said arithmetic circuit deriving a basic slip angle on the basis of values of said longitudinal acceleration indicative signal and said lateral acceleration indicative signal, and corecting said basic slip angle with a correction factor derived on the basis of said wheel speed indicative signal.

2. A slip angle monitoring system as set forth in claim 1, wherein said arithmetic circuit derives said correction factor by differentiating said wheel speed indicative signal.

3. A slip angle monitoring system as set forth in claim 1, wherein said correction factor is a wheel acceleration data to be added to said longitudinal acceleration indicative signal value.

4. A slip angle monitoring system as set forth in claim 1, wherein said arithmetic circuit derives said basic slip angle by dividing said longitudinal acceleration indicative signal value by said lateral acceleration indicative signal value.

5. A slip angle monitoring system as set forth in claim 1, wherein said arithmetic circuit compares said lateral acceleration indicative signal value with a predetermined lateral acceleration criterion to derive said slip angle, sets said slip angle at zero when said lateral acceleration indicative signal value is smaller than or equal to said criterion, and outputs said slip angle at an arithmetically derived value when said lateral acceleration indicative signal value is greater than said lateral acceleration criterion.

6. A system for monitoring slip angle of a vehicle comprising:

longitudinal acceleration monitoring means for monitoring longitudinal acceleration exerted on said vehicle and producing a longitudinal acceleration indicative signal;

lateral acceleration monitoring means for monitoring lateral acceleration exerted on said vehicle and producing a lateral acceleration indicative signal;

an arithmetic circuit for receiving said longitudinal acceleration indicative signal, said arithmetic circuit comparing said lateral acceleration indicative signal with a predetermined value range to derive slip angle data, setting said slip angle data to zero when said lateral acceleration indicative signal is within said predetermined value range, and calculating said slip angle data on the basis of values of said longitudinal acceleration indicative signal and said lateral acceleration indicative signal is out of said predetermined value range, and modifying said slip angle data with a correction value derived on the basis of wheel speed.

7. A slip angle monitoring system as set forth in claim 6, wherein said arithmetic circuit derives said slip angle data by dividing said longitudinal acceleration indicative signal value by said lateral acceleration indicative signal value.

8. A system for monitoring slip angle of a vehicle comprising:

longitudinal acceleration monitoring means for monitoring longitudinal acceleration exerted on said vehicle and producing a longitudinal acceleration indicative signal;

lateral acceleration monitoring means for monitoring lateral acceleration exerted on said vehicle and producing a lateral acceleration indicative signal;

wheel acceleration monitoring means for monitoring wheel acceleration and producing a wheel acceleration indicative signal;

an arithmetic circuit for receiving said longitudinal acceleration indicative signal, said arithmetic circuit comparing said lateral acceleration indicative signal with a predetermined value range to derive slip angle data, setting said slip angle data to zero when said lateral acceleration indicative signal is within said predetermined value range, and calculating a basic slip angle on the basis of values of said longitudinal acceleration indicative signal and said lateral acceleration indicative signal when said lateral acceleration indicative signal is out of said predetermined value range, and correcting said basic slip angle with a correction factor derived on the basis of said wheel acceleration indicative signal.

9. A slip angle monitoring system as set forth in claim 8, wherein said correction factor is a wheel acceleration indicative data to be added to said longitudinal acceleration indicative signal value.

10. A slip angle monitoring system as set forth in claim 9, wherein said arithmetic circuit derives said basic slip angle by dividing said longitudinal acceleration indicative signal value by said lateral acceleration indicative signal value.

11. A system for monitoring the slip angle of a vehicle comprising:

longitudinal acceleration monitoring means for monitoring longitudinal acceleration exerted on said vehicle and producing a longitudinal acceleration indicative signal;

lateral acceleration monitoring means for monitoring lateral acceleration exerted on said vehicle and producing a lateral acceleration indicative signal;

a wheel speed sensor for monitoring rotation speed of a vehicular wheel to produce a wheel speed indicative signal; and an arithmetic circuit for receiving said longitudinal acceleration indicative signal, said lateral acceleration indicative signal and said wheel speed indicative signal, said arithmetic circuit being set to a deadband in a predetermined range of magnitude of lateral acceleration and active in response to said lateral acceleration indicative signal being out of said deadband for deriving a basic slip angle on the basis of values of said longitudinal acceleration indicative signal and said lateral acceleration indicative signal, and correcting said basic slip angle with a correction factor derived on the basis of said wheel speed indicative signal.

12. A slip angle monitoring system as set forth in claim 11, wherein said arithmetic circuit derives said correction factor by differentiating said wheel speed indicative signal.

13. A system for monitoring slip angle of a vehicle comprising:

longitudinal acceleration monitoring means for monitoring longitudinal acceleration exerted on said vehicle and producing a longitudinal acceleration indicative signal;

lateral acceleration monitoring means for monitoring lateral acceleration exerted on said vehicle and producing a lateral acceleration indicative signal;

a wheel speed sensor for monitoring rotation speed of a vehicular wheel to produce a wheel speed indicative signal; and an arithmetic circuit for receiving said longitudinal acceleration indicative signal, said lateral acceleration indicative signal and said wheel speed indicative signal, said arithmetic circuit deriving a basic slip angle on the basis of values of said longitudinal acceleration indicative signal and said lateral acceleration indicative signal and further deriving a wheel acceleration indicative signal on the basis of said wheel speed indicative signal, and correcting said basic slip angle with a correction factor derived on the basis of said wheel acceleration indicative signal.

* * * * *